United States Patent
Bunton et al.

(10) Patent No.: US 6,249,756 B1
(45) Date of Patent: Jun. 19, 2001

(54) HYBRID FLOW CONTROL

(75) Inventors: William Patterson Bunton, Pflugerville; David A. Brown, Austin; David T. Heron, Austin; Charles Edward Peet, Jr., Austin; William Joel Watson, Austin; John C. Krause, Georgetown, all of TX (US)

(73) Assignee: Compaq Computer Corp., Houston, TX (US)

( * ) Notice: Subject to any disclaimer, the term of this patent is extended or adjusted under 35 U.S.C. 154(b) by 0 days.

(21) Appl. No.: 09/206,481

(22) Filed: Dec. 7, 1998

(51) Int. Cl.[7] .............................. G06F 13/00; G06F 3/00
(52) U.S. Cl. ............................ 703/25; 703/20; 709/233; 709/234; 710/33; 712/201; 370/414; 340/825.5
(58) Field of Search ................................. 703/25, 27, 28, 703/20; 710/33, 60; 712/201; 709/233, 234, 235; 370/444, 455, 414, 417, 418; 340/825.5

(56) References Cited

U.S. PATENT DOCUMENTS

| | | | |
|---|---|---|---|
| 5,208,810 | * 5/1993 | Park | 370/94.1 |
| 5,268,900 | * 12/1993 | Hluchyj et al. | 370/94.1 |
| 5,557,751 | * 9/1996 | Banman et al. | 395/250 |
| 5,574,849 | * 11/1996 | Sonnier et al. | 395/182.1 |
| 5,675,579 | * 10/1997 | Watson et al. | 370/248 |
| 5,694,121 | 12/1997 | Krause et al. | 340/825.5 |
| 5,710,549 | 1/1998 | Horst et al. | 340/825.5 |
| 5,867,501 | * 2/1999 | Horst et al. | 370/474 |

* cited by examiner

*Primary Examiner*—Kevin J. Teska
*Assistant Examiner*—Thai Phan
(74) *Attorney, Agent, or Firm*—Leah Sherry; Justin Boyce; Oppenheimer Wolff & Donnelly LLP

(57) ABSTRACT

An improved hybrid flow control protocol for providing FIFO capacity to prevent overflow due to bytes arriving after the FIFO indicates it is not ready to receive any more bytes utilizes a combination of a high/low watermark and credit based system. In one embodiment, when the byte count exceed the high watermark fixed credits are sent when N bytes are pulled from the FIFO. In a second embodiment, variable credits are sent depending on the difference between the number of bytes received in and pulled from the FIFO.

6 Claims, 4 Drawing Sheets

| Link Length meters | Round Trip Delay ns | FIFO Size data bytes |
|---|---|---|
| 10 | 452 | 114 |
| 20 | 553 | 138 |
| 50 | 852 | 214 |
| 100 | 1352 | 338 |
| 200 | 2352 | 588 |
| 500 | 5352 | 1338 |
| 1000 | 10352 | 2588 |
| 2000 | 20352 | 5088 |
| 5000 | 50352 | 12588 |

FIFO Depth vs. Length

State Graph Hybrid 1 Flow Control Protocol

HYBRID FLOW CONTROL

BACKGROUND OF THE INVENTION

Data transfer systems such as networks and I/O busses always have latency due to the finite time of signal propagation over physical media. Accordingly, receive buffers must include capacity to handle data that is in transit when a full or BUSY signal is generated indicating that the receive buffer is full. As the distance between transmitting nodes and the receive buffer increases the required latency capacity of the buffer must also increase. Prior art flow control systems generally use either a high/low watermark system or a credit based system.

A typical high/low watermark flow control system is depicted in FIGS. 1 and 2. FIG. 1 depicts a receive FIFO and FIG. 2 is simplified state graph of the operation of the FIFO. If the receive FIFO transmits a busy signal at time t0 and the transit time to the transmitting module is t1 then the transmitting module will continue transmitting until t3=t0+t1. Thus, the "Round trip depth" is all the data that was in transit at t0 plus the data that was transmitted between t0 and t3. Additional data will also be transmitted due to logic delays in generating and responding to the BUSY signal.

The prior art flow control protocol uses FIFO high and low watermarks to control the state of a receive link. If the FIFO is above the high watermark the link is busy, and BUSY command symbols are transmitted. If the FIFO is below the low watermark the link is ready, and READY command symbols are transmitted.

At system start-up the receive FIFO is empty and below the low watermark. In this flow control state (FCS), the receiver is ready and the READY command signals are transmitted regularly as required. When receive data arrive, they are pushed into the FIFO, and their availability is reported to the output side. When output is unblocked, the receive data is pulled from the FIFO as soon as available. If the output path is blocked or running at a lower transfer rate, data will accumulate in the FIFO.

When the accumulated data reaches the high watermark, the state of the link changes from inbound READY to inbound BUSY. This state change causes the keep alive protocol to send a BUSY signal to stop the flow of data. If there is insufficient space above the high watermark (less than a round trip delay) or the BUSY command is corrupted, receive data may overflow the FIFO. This flow control relies on the buffer space above the high watermark to prevent FIFO overflow by compensating for the delayed response to the BUSY. When sufficient data has been pulled from the FIFO to bring it below the low watermark, the state will return to inbound ready causing the keep alive protocol to send a READY command symbol to restart the flow of data. The storage below the low watermark is used to prevent data underflow.

The FIFO can be sized to support a desired link length by computing the round trip propagation delay of the link. The four link delay components are:

1. Local Node logic Delay (LND) (300 to 450 ns)
2. Outbound physical media delay (PMD) (5 ns/meter)
3. Remote Node logic Delay (RND) (300 to 450 ns)
4. Inbound physical media delay (PMD) (5 ns/meter)

On short links (less than 30 to 50 meters) the propagation delay is dominated by logic delay in the local and remote nodes. The longer links are dominated by delay in the physical media. To provide full link performance the FIFO must be sized 20 to have a full link round trip delay of characters above the high water-mark and the same amount below the low watermark. The table of FIG. 3 lists a few link lengths and the required FIFO depth. The prior art flow control protocol requires equal amounts of storage above and below the watermarks. For long links, the storage required exceeds the on-chip storage available in current ASIC technology.

Prior credit based flow control protocols issue fixed credits to sending nodes. However, these systems have major start-up and lost-credit problems. At start-up the receive FIFO remains empty until a transmitting node receives a credit and sets up its credit management protocol. If a credit is lost, the transmitting node will wait for a credit and the receiving node will wait for a transmission. The complexity of initialization and error recovery to recover lost credits are major drawbacks of a credit based system.

SUMMARY OF THE INVENTION

According to one aspect of the present invention, a hybrid flow control system utilizes aspects of the high/low watermark and credit based systems to reduce FIFO size in systems with high latency due to increased link transfer latency. Additionally, control overhead is minimized.

According to a further aspect of the invention, a receive FIFO has in input into which received bytes are pushed and an output from which bytes are pulled. First and second numbers are designated as a low watermark and a high watermark, with the high watermark being greater than the low watermark. When the number of bytes stored in the FIFO is less than the low watermark the FIFO indicates it is READY to receive bytes. When the number of bytes stored exceeds the high watermark the FIFO asserts a BUSY signal to stop the transmission of bytes. The difference between the high watermark and total capacity of the FIFO is sufficient to accommodate data already in transmission over the physical links between the senders and the receive FIFO.

Subsequent to the assertion of the BUSY signal, the number of bytes pulled from the FIFO are counted. When the number counted exceeds a selected number, N, a credit of N bytes is transmitted to the sender. Thus, even though the number of bytes stored may be greater than the low watermark, the transmission of another N bytes is authorized.

It is important to maintain the flow of data to prevent under-running the FIFO. By issuing credits even when the byte count is greater than the low watermark, the byte count in the receive FIFO is kept higher than the high watermark. Thus, if there is an interruption in the receipt of bytes the FIFO will be able to continue to supply the receiving node with data for a longer length of time than would be possible with a prior art high/low watermark system.

According to a still further aspect of the invention, a hybrid flow control protocol provides for a variable credit. Subsequent to the assertion of the BUSY signal, a counter is incremented for every byte pulled and decrement for every byte pushed into the receive FIFO. When the count is greater than a predetermined number the READY signal is asserted until the count is equal to zero. Thus, the number of bytes that can be received is variable, depending on the difference between the rate at which bytes are being received and the rate at which bytes are being pulled.

According to a further aspect of the invention, if the rate of pulling bytes is at least equal to the rate of receiving bytes, subsequent to the assertion of BUSY the READY signal is asserted as long as bytes are being pulled from the receive FIFO.

Other features and advantages of the invention will be apparent in view of the following detailed description and appended claims.

DESCRIPTION OF THE SPECIFIC EMBODIMENTS

A preferred embodiment of the invention will now be described in the context of the ServerNet (SNet) system area network (SAN). SNet I and SNet II are scalable networks that support read, write, and interrupt semantics similar to previous generations I/O busses and are manufactured and distributed by the assignee of the present invention.

Figure 1:
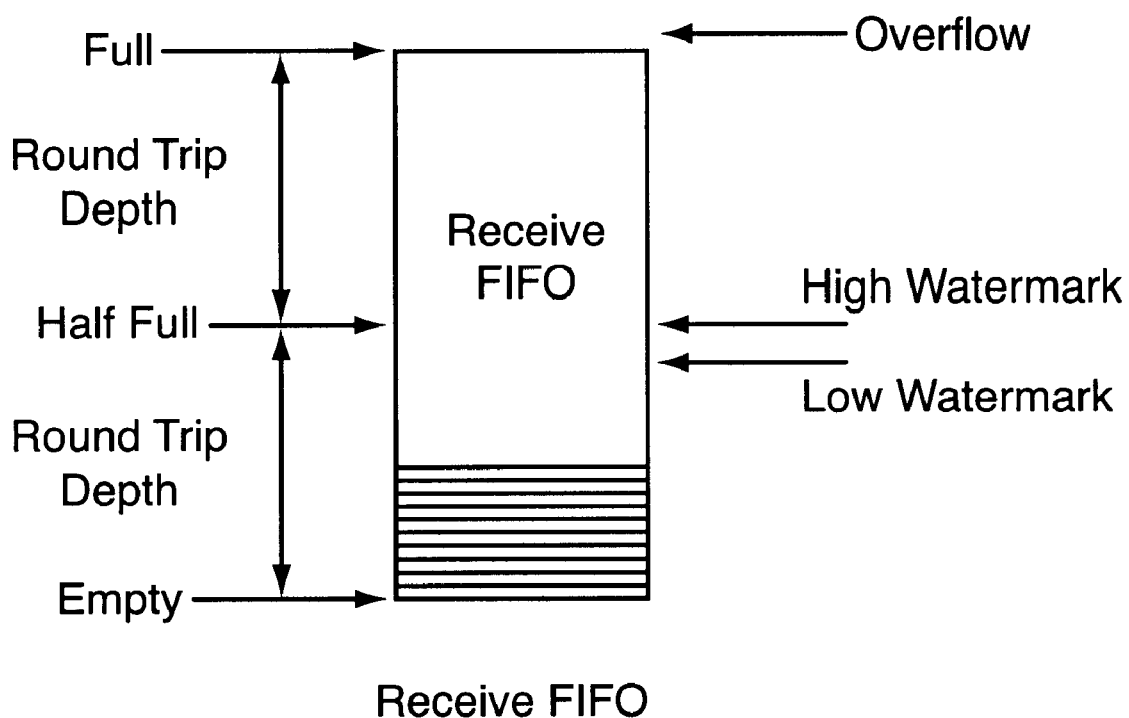
FIG 1. is a schematic diagram depicting a prior art flow control FIFO.
Figures 2, 3:
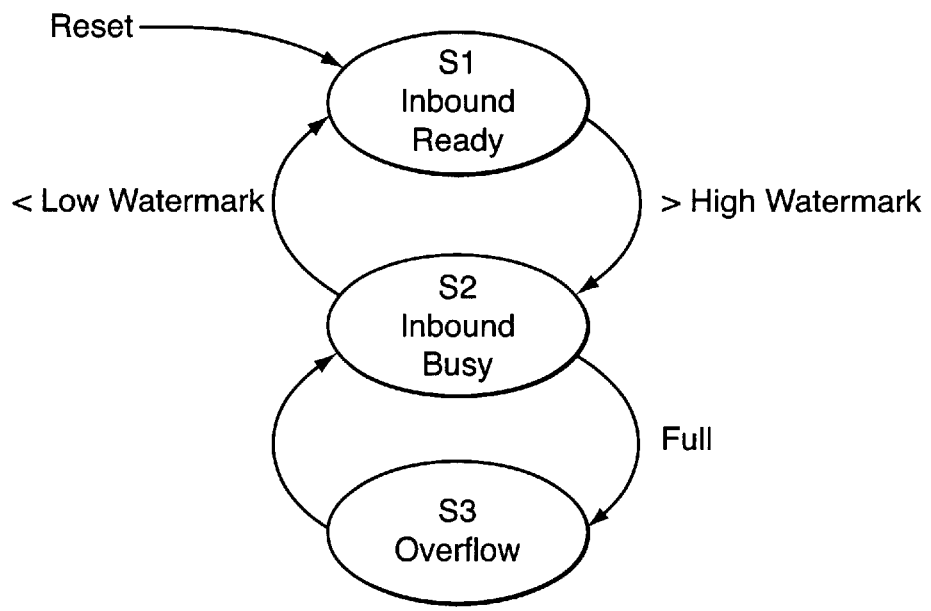
FIG. 2 is a state diagram depicting the operation of the prior art flow control FIFO.
FIG. 3 is a table illustrating the increase in FIFO size caused by increased cable length latency.
Figure 4:
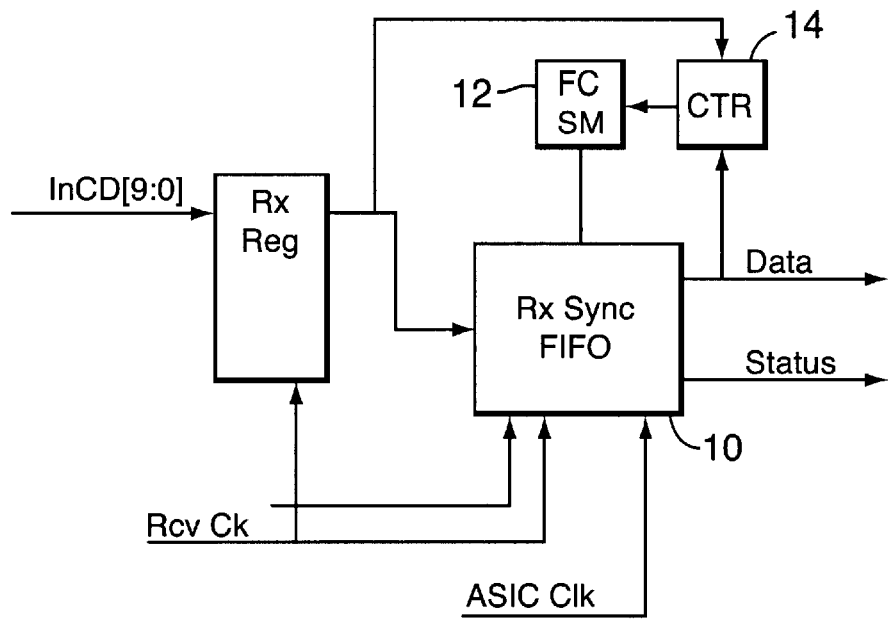
FIG. 4 is a block diagram of a receive port.

A first embodiment of a hybrid flow control protocol (hybrid I) will now be described that combines the current ready/busy protocol and a credit base protocol to reduce the required FIFO size. FIG. 4 depicts a receive port including a receive FIFO 10, a flow control state machine 12, and a counter 14.

At system start-up, hybrid I behaves like the standard ready/busy protocol.

Figure 5:
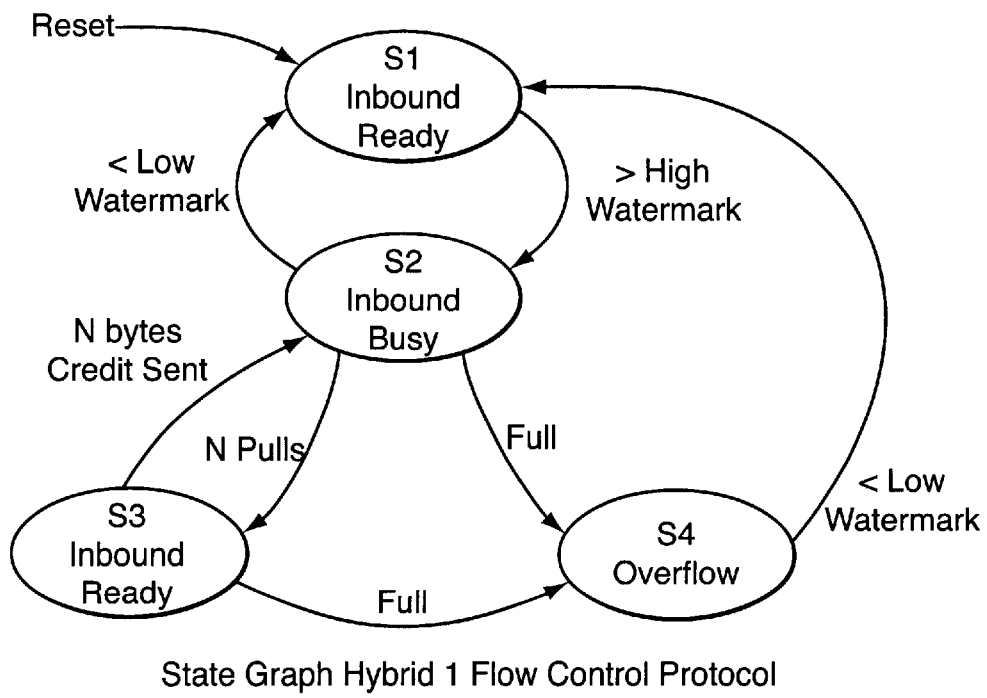
FIG. 5 is a state diagram depicting a flow control protocol of a first embodiment of the invention.

The behavior changes only when the FIFO is above the high watermark. A simplified state graph is shown in FIG. 5.

While the FIFO is above the high watermark, control logic counts the pulls for the FIFO; when a small number (16 to 64) of pulls have accumulated, a credit for N characters is issued to the transmitting node. The credit is generated by sending a READY /BUSY pair of command symbols separated by N symbol times. Issuing credits to maintain the flow of data while the FIFO is above the high watermark prevents underflow and eliminates the need for a round trip delay of characters below the low watermark.

The hybrid I flow control protocol still needs a full round trip delay of characters above the high watermark to prevent link overflow. Both watermarks for hybrid I flow control should be placed near empty. A small amount of buffer (<100 characters) is needed between the high watermark and an empty FIFO. This storage should be sized to allow non-back-pressured operation without filling the FIFO above the high watermark.

The required size for a FIFO controlled by the hybrid protocol is only slightly greater (<100 characters) than a full round trip delay of characters. This size is only a hundred or so bytes greater than half the size of a FIFO using the simple ready/busy flow control protocol.

This hybrid avoids two major credit based flow control problems, start-up and lost-credit. No credits are required for start-up, after reset the receiver is ready, and the keep alive protocol sends repeated READY to start the flow of data. If a READY /BUSY credit pair is lost, additional credit will be sent as data is pulled from the FIFO. When the FIFO is pulled below the low watermark, additional READYs will be sent to allow data to continue to flow.

When operating in the credit base flow control mode, a READY /BUSY credit pair is transmitted for every N data symbols pulled from the FIFO. To have the same command symbol efficiency as the as the simple ready/ busy flow control protocol the credit size would need to be at least 512 bytes.

The hybrid I flow control protocol uses fixed-size credits causing the protocol to make inefficient use of link bandwidth in the credit base flow control mode. In a second embodiment (hybrid II), a variable size credit can improve link efficiency by issuing larger credits, which require fewer flow control command symbols. The variable size credit flow control protocol is an improvement of the hybrid I protocol described above. None of the hybrid I protocol benefits are sacrificed, and the flow control overhead is reduced. A simplified state graph for the hybrid II flow control state machines shown in FIG. 6A.

At start-up and below the high watermark, all three flow control protocols (prior art, hybrid I, and hybrid II) have the same behavior. Above the high watermark, both hybrid protocols switch to a credit based mode. Hybrid I sends fixed size credits; hybrid 2 sends variable size credits. The hybrid 2 protocol uses the credit counter 14 to generate the variable size credits.

Figure 6A:
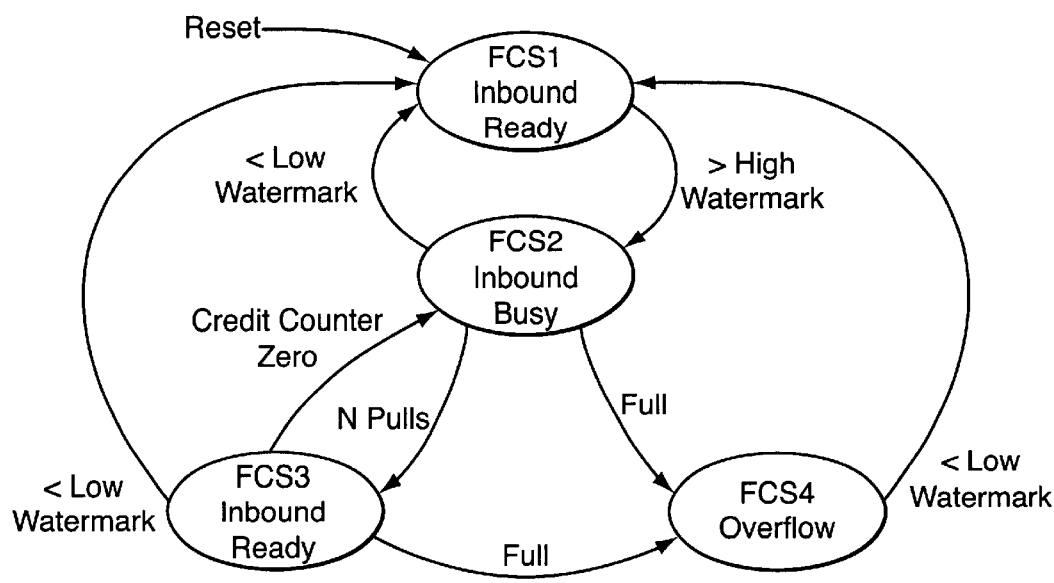
FIGS. 6A and B are state diagrams depicting a flow control protocol of a second embodiment of the invention.

Referring to FIG. 6A, when the FIFO depth exceeds the high watermark, the flow control changes from inbound ready (FCS 1) to inbound busy state (FCS2). In the inbound busy state, the keep alive protocol is sending BUSYs, and the credit counter is incremented each time data is pulled for the FIFO. When N bytes have been pulled from the FIFO, the link state is changed to link ready state (FCS3), and the keep alive protocol will send READY commands restarting the flow of data. As long as the credit counter is greater than zero, the link can remain in the link ready state (FCS3). If the pull side logic continues to remove date from the FIFO the depth could be pulled below the low watermark without returning to the inbound busy state (FCS2).

Figure 6B:
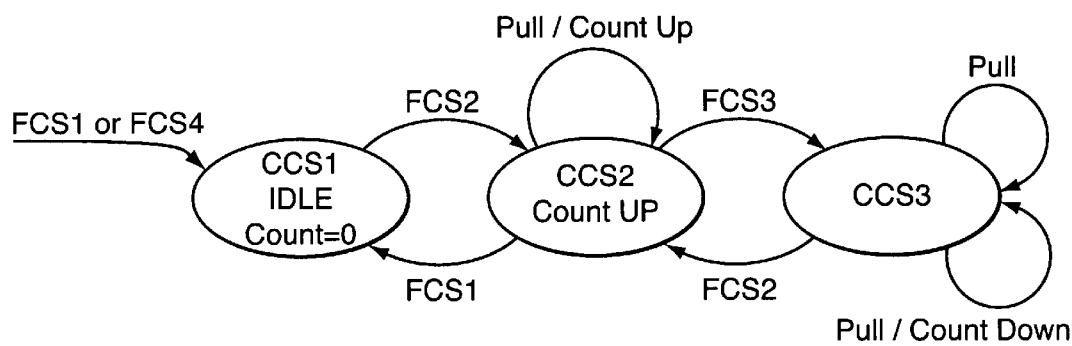

FIG. 6B depicts a state graph for the credit counter state machine. When the flow control state machine transitions to Inbound Busy (FCS2), the counter transitions to the count UP state (CCS2) and increments the count for every byte pulled from the FIFO. When N pulls have been counted the flow control state transitions to Inbound Ready (FCS3) and the credit counter machine transitions to CCS3. The count is incremented for every byte pulled (Pull) and decremented for byte received (!Pull). If the counter value returns to zero the flow control state machine transitions back to Inbound Busy and the credit counter transitions to Count Up (CCS2).

A variation of the hybrid II protocol is to remain in the Inbound Ready state as long as bytes are being pulled from the FIFO. This variation is possible if the pull rate is equal to or greater than the rate at which bytes are received.

In a configuration with the low pull rates of ServerNet II to ServerNet I (125M to 50M), data will accumulate in the FIFO without pull side contention. In these configurations, variable size credits will reduce the flow control command overhead, but will never be able to reduce it to zero. A hybrid flow control protocol which combines a simple ready/ busy flow control protocol and variable size credit based flow control protocol can radically reduce (to nearly half) the buffer space required for long link flow control. The use of variable size credits will eliminate most, and some times all, of the command symbol overhead of credit based flow control protocol. The hybrid flow control protocol can be used to limit the FIFO depth needed for very long ServerNet links.

The invention has now been described with reference to the preferred embodiments. Alternatives and substitutions will now be apparent to persons of skill in the art. In particular, although the described embodiments have been implemented in the ServerNet II system area network, the principles of the invention are applicable to any bus or network system having FIFO receive buffers that must compensate for signal transmission latency. Further, the embodiments are implemented utilizing state machines on ASICs, but the control could also be implemented utilizing software. Accordingly, it is not intended to limit the invention except as provided by the appended claims.

What is claimed is:

1. An improved flow control system for use in a communication system having interconnected transmit and receive nodes connected by physical links, with the magnitude of internode round trip communication delays dependent on the length of the physical link between nodes and the magnitude of node logic delays, and with a receive node indicating a READY state when it is ready to receive words and indicating a BUSY state when it is unable to receive words, said system comprising:

a receive FIFO having an input into which words received from the link are pushed and an output from which received words are pulled, with the receive FIFO capable of holding a first predetermined number of words and overflowing if words are pushed faster than pulled and more words accumulate than the first predetermined number, with a first number, designated a low watermark, and a second number, designated a high watermark, and with the low watermark being less than the high watermark and the high watermark being less than the first predetermined number, with said receive FIFO having capacity above said high watermark to accumulate receipt of delayed words transmitted after a BUSY state is indicated without overflowing;

a flow controller, coupled to said receive FIFO for controlling said receive FIFO, said flow controller configured to:

indicate a READY state if the number of words accumulated in the receive FIFO is less than the low watermark;

indicate a BUSY state if the number of words accumulated in the receive FIFO is greater than the high watermark;

while in the BUSY state and while the number of words accumulated in the receive FIFO is greater than the low watermark;

to send an N word credit message to the sending node when a number of words pulled from said FIFO exceeds a second predetermined number (N) so that the sending node may send an additional N words while the BUSY state is indicated.

2. An improved flow control system for use in a communication system having interconnected transmit and receive nodes connected by physical links, with the magnitude of internode round trip communication delays dependent on the length of the physical link between nodes and the magnitude of node logic delays, and with a receive node indicating a READY state when it is ready to receive words and indicating a BUSY state when it is unable to receive words, said system comprising:

a receive FIFO having an input into which words received from the link are pushed and an output from which received words are pulled, with the receive FIFO capable of holding a fixed number of words and overflowing if words are pushed faster than pulled and more words accumulate than the fixed number, with a first number, designated a low watermark, and a second number, designated a high watermark, and with the low watermark being less than the high watermark and the high watermark being less than the fixed number, with said receive FIFO having capacity above said high watermark to accumulate receipt of delayed words transmitted after a BUSY state is indicated without overflowing;

a counter, coupled to said FIFO, that indicates, subsequent to an indication of a BUSY state and while the number of words accumulated in the receive FIFO is less than the low watermark, the difference between the number of words pulled from said receive FIFO and the number of words pushed into said receive FIFO;

a flow controller, coupled to said receive FIFO for controlling said receive FIFO, said flow controller configured to:

indicate a READY state if the number of words accumulated in the receive FIFO is less than the low watermark;

indicate a BUSY state if the number of words accumulated in the receive FIFO is greater than the high watermark;

while in the BUSY state and while the number of words accumulated in the receive FIFO is greater than the low watermark;

indicate a READY state when the difference indicated by said counter exceeds a second predetermined number to indicate to the sending node that transmission may proceed;

continuing to indicate said READY state as long as the difference is greater than a third predetermined number, the third predetermined number being less than said second predetermined number, and to indicate a BUSY state if the difference is equal to said third predetermined number.

3. An improved flow control system for use in a communication system having interconnected transmit and receive nodes connected by physical links, with the magnitude of internode round trip communication delays dependent on the length of the physical link between nodes and the magnitude of node logic delays, and with a receive node indicating a READY state when it is ready to receive words and indicating a BUSY state when it is unable to receive words, said system comprising:

a receive FIFO having an input into which words received from the link are pushed and an output from which received words are pulled, with the receive FIFO capable of holding a first predetermined number of words and overflowing if words are pushed faster than pulled and more words accumulate than the first predetermined number, with a first number, designated a low watermark, and a second number, designated a high watermark, and with the low watermark being less than the high watermark and the high watermark being less than the first predetermined number, with said receive FIFO having capacity above said high watermark to accumulate receipt of delayed words transmitted after a BUSY state is indicated without overflowing;

a flow controller, coupled to said receive FIFO for controlling said receive FIFO, said flow controller configured to:

indicate a READY state if the number of words accumulated in the receive FIFO is less than the low watermark;

indicate a BUSY state if the number of words accumulated in the receive FIFO is greater than the high watermark;

while in the BUSY state and while the number of words accumulated in the receive FIFO is greater than the low watermark;

indicate a READY state when a number of words pulled from said receive FIFO exceeds a second predetermined number to indicate to the sending node that transmission may proceed;

continuing to indicate said READY state as long as words continue to be pulled from said receive FIFO.

4. An improved flow control system for use in a communication system having interconnected transmit and receive nodes connected by physical links, with the magnitude of internode round trip communication delays dependent on the length of the physical link between nodes and the magnitude of node logic delays, and with a receive node indicating a READY state when it is ready to receive words and indicating a BUSY state when it is unable to receive words, said system comprising:

a receive FIFO having an input into which words received from the link are pushed and an output from which received words are pulled, with the receive FIFO capable of holding a first predetermined number of words and overflowing if words are pushed faster than pulled and more words accumulate than the first predetermined number, with a first number, designated a low watermark, and a second number, designated a high watermark, and with the low watermark being less than the high watermark and the high watermark being less than the first predetermined number, with said receive FIFO having capacity above said high watermark to accumulate receipt of delayed words transmitted after a BUSY state is indicated without overflowing;

a flow controller, coupled to said receive FIFO for controlling said receive FIFO, said flow controller configured to:

indicate a READY state if the number of words accumulated in the receive FIFO is less than the low watermark;

indicate a BUSY state if the number of words accumulated in the receive FIFO is greater than the high watermark;

while in the BUSY state and while the number of words accumulated in the receive FIFO is greater than the low watermark;

assert said READY signal so long as words are being pulled from the receive FIFO.

5. The system of claim 1, 2, 3, or 4 where said receive FIFO is implemented on an application specific semiconductor chip (ASIC) and wherein:

said flow controller is a state machine implemented on said ASIC.

6. An improved flow control system for use in a communication system having interconnected transmit and receive nodes connected by physical links, with the magnitude of internode round trip communication delays dependent on the length of the physical link between nodes and the magnitude of node logic delays, and with a receive node indicating a READY state when it is ready to receive words and indicating a BUSY state when it is unable to receive words, said system comprising:

a receive FIFO having an input into which words received from the link are pushed at a first rate and an output from which received words are pulled at a second rate, with the receive FIFO capable of holding a first predetermined number of words and overflowing if words are pushed faster than pulled and more words accumulate than the first predetermined number, with a first number, designated a low watermark, and a second number, designated a high watermark, and with the low watermark being less than the high watermark and the high watermark being less than the first predetermined number, with said receive FIFO having capacity above said high watermark to accumulate receipt of delayed words transmitted after a BUSY state is indicated without overflowing;

a flow controller, coupled to said receive FIFO for controlling said receive FIFO, said flow controller configured to:

indicate a READY state if the number of words accumulated in the receive FIFO is less than the low watermark;

indicate a BUSY state if the number of words accumulated in the recieve FIFO is greater than the high watermark;

while the busy state and while the number of words accumulated in the receive BUSY is greater than the low watermark;

assert said READY signal so long as said second rate at which words are being pulled is greater than or equal to said first rate at which words are being received.

\* \* \* \* \*

UNITED STATES PATENT AND TRADEMARK OFFICE
CERTIFICATE OF CORRECTION

PATENT NO. : 6,249,756 B1
DATED : June 19, 2001
INVENTOR(S) : Bunton et al.

It is certified that error appears in the above-identified patent and that said Letters Patent is hereby corrected as shown below:

Column 8,
Line 41, reads "while the busy state and while the number of words" it should read
-- while in the busy state and while the number of words --;
Line 42, reads "accumulted in the receive BUSY is greater than the" it should read
-- accumulated in the receive FIFO is greater than the --

Signed and Sealed this

Sixth Day of August, 2002

Attest:

Attesting Officer

JAMES E. ROGAN
*Director of the United States Patent and Trademark Office*